US010522115B2

(12) United States Patent
Hwang et al.

(10) Patent No.: US 10,522,115 B2
(45) Date of Patent: Dec. 31, 2019

(54) DISPLAY APPARATUS FOR DISPLAYING COLOR IDENTIFICATION CODE AND CONTROL METHOD THEREOF

(71) Applicant: SAMSUNG ELECTRONICS CO., LTD., Suwon-si (KR)

(72) Inventors: Kwang-il Hwang, Seoul (KR); Woo-seok Kim, Bucheon-si (KR); Jong-ho Lea, Seongnam-si (KR); Morio Yoshimoto, Nishinomiya (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/347,330

(22) Filed: Nov. 9, 2016

(65) Prior Publication Data
US 2017/0132991 A1 May 11, 2017

(30) Foreign Application Priority Data
Nov. 10, 2015 (KR) .................. 10-2015-0157622

(51) Int. Cl.
 G09G 5/377 (2006.01)
 G09G 3/20 (2006.01)
 G06F 16/955 (2019.01)
 G06K 19/06 (2006.01)

(52) U.S. Cl.
 CPC ......... *G09G 5/377* (2013.01); *G06F 16/9554* (2019.01); *G06K 19/06009* (2013.01); *G09G 3/2003* (2013.01); *G09G 3/2085* (2013.01); *G09G 3/2092* (2013.01);
(Continued)

(58) Field of Classification Search
None
See application file for complete search history.

(56) References Cited

U.S. PATENT DOCUMENTS

| 4,305,131 A * | 12/1981 | Best ....................... A63F 13/00 273/460 |
| 7,850,067 B1 | 12/2010 | Persson et al. |
| 8,554,084 B2 | 10/2013 | Song et al. |

(Continued)

FOREIGN PATENT DOCUMENTS

| JP | 2010-33588 A | 2/2010 |
| JP | 2013-84031 A | 5/2013 |

(Continued)

OTHER PUBLICATIONS

Eric Monteiro, Design and Implementation of Color-Shift Keying for Visible Light Communications, 2013, Master of Applied Science, Electrical & Computer Engineering, McMaster University, Ontario, Canada.*

(Continued)

*Primary Examiner* — Michael J Cobb
(74) *Attorney, Agent, or Firm* — Sughrue Mion, PLLC

(57) ABSTRACT

A display apparatus is provided. The display apparatus includes a display, a communicator configured to receive a color identification code based on HTML5 from a server, and a processor configured to control the display to display the color identification code and an image corresponding to the color identification code. The color identification code includes information associated with the displayed image and is recognizable by an external apparatus that captures the displayed color identification code.

17 Claims, 15 Drawing Sheets

(52) U.S. Cl.
CPC . *G09G 2370/022* (2013.01); *G09G 2370/027* (2013.01); *G09G 2370/16* (2013.01)

(56) References Cited

U.S. PATENT DOCUMENTS

| | | | |
|---|---|---|---|
| 8,812,369 B2 | 8/2014 | Jeong | |
| 2003/0142751 A1* | 7/2003 | Hannuksela | G11B 27/02 375/240.25 |
| 2006/0160528 A1* | 7/2006 | Wang | H04M 1/72544 455/418 |
| 2006/0215987 A1* | 9/2006 | Horentrup | G06F 3/0482 386/248 |
| 2008/0023546 A1 | 1/2008 | Myodo et al. | |
| 2008/0076402 A1 | 3/2008 | Jeong | |
| 2009/0086814 A1* | 4/2009 | Leontaris | H04N 19/105 375/240.02 |
| 2009/0156170 A1* | 6/2009 | Rossano | H04L 51/38 455/412.1 |
| 2009/0254954 A1 | 10/2009 | Jeong | |
| 2012/0128365 A1 | 5/2012 | Paek et al. | |
| 2013/0064541 A1 | 3/2013 | Walewski | |
| 2013/0230241 A1 | 9/2013 | Cheong et al. | |
| 2014/0292768 A1* | 10/2014 | Tobin | G06T 13/80 345/473 |
| 2014/0297516 A1* | 10/2014 | Brown | G06F 3/04817 705/39 |
| 2014/0326792 A1 | 11/2014 | Sakahashi et al. | |
| 2015/0172246 A1* | 6/2015 | Velummylum | H04L 51/18 709/206 |
| 2015/0221340 A1* | 8/2015 | Tran | G11B 27/034 386/280 |
| 2015/0262221 A1* | 9/2015 | Nakano | G06Q 30/0275 705/14.45 |
| 2015/0289022 A1* | 10/2015 | Gross | H04N 21/4725 725/51 |
| 2015/0317657 A1* | 11/2015 | Boudville | G06Q 20/3276 705/7.35 |
| 2015/0339732 A1 | 11/2015 | Lee et al. | |
| 2016/0379029 A1* | 12/2016 | Fang | G06K 7/146 235/462.04 |
| 2018/0276523 A1* | 9/2018 | Okada | G06K 7/1443 |

FOREIGN PATENT DOCUMENTS

| | | | |
|---|---|---|---|
| JP | 2014116706 A | * | 6/2014 |
| JP | 2015-088981 A | | 5/2015 |
| KR | 10-2006-0049682 A | | 5/2006 |
| KR | 10-211-0017791 A | | 2/2011 |
| KR | 10-2013-0090504 A | | 8/2013 |
| KR | 10-2014-0118181 A | | 10/2014 |
| KR | 10-1497414 B1 | | 3/2015 |
| KR | 10-2015-0135718 A | | 12/2015 |

OTHER PUBLICATIONS

Michail Vasilakis, DynaLight: A Dynamic Visible Light Communication Link for Smartphones, 2015, Master's Theseis in Embedded Systems, Delft University of Technology, Delft, The Netherlands.*

Tian Hao, Ruogu Zhou, Guoliang Xing, COBRA: Color Barcode Streaming for Smartphone Systems, 2012, Proceedings of the 10Th International Conference on Mobile Systems, Applications, and Services, pp. 85-98 (Year: 2012).*

Eric Monteiro, Design and Implementation of Color-Shift Keying for Visible Light Communications, 2013, Master's Thesis, McMaster University, Ontario, Canada, pp. 1-116 (Year: 2013).*

Anonymous, "High Capacity Color Barcode—Wikipedia, the free encyclopedia", Oct. 2, 2015, pp. 1-3, Retrieved from the Internet: URL:https://web-beta.archive.org/web/20151002222103/https://en.wikipedia.org/wiki/High_Capacity_Color_Barcode [retrieved on Dec. 23, 2016].

Communication dated Jan. 9, 2017 issued by the European Patent Office in European Patent Application No. 16198042.0.

International Search Report and Written Opinion dated Feb. 20, 2017 issued by the International Searching Authority in International Patent Application No. PCT/KR2016/012900 (PCT/ISA/210 and PCT/ISA/237).

Shih-Hao Chen, et al., "Color-Shift Keying and Code-Division Multiple-Access Transmission for RGB-LED Visible Light Communications Using Mobile Phone Camera", IEEE Photonics Journal, vol. 6, No. 6, Dec. 2014, total 7 pages.

Communication dated Oct. 9, 2015, issued by the European Patent Office in counterpart European application No. 15168352.1.

Querini, Marco et al., "Reliability and Data Density in High Capacity Color Barcodes", Computer Science and Information Systems, vol. 11, No. 4, Oct. 2014, pp. 1595-1615, XP055616394. (21 pages total).

Communication dated Sep. 9, 2019 issued by the European Patent Office in counterpart European Patent Application No. 16198042.0.

* cited by examiner

FIG. 2
(RELATED ART)
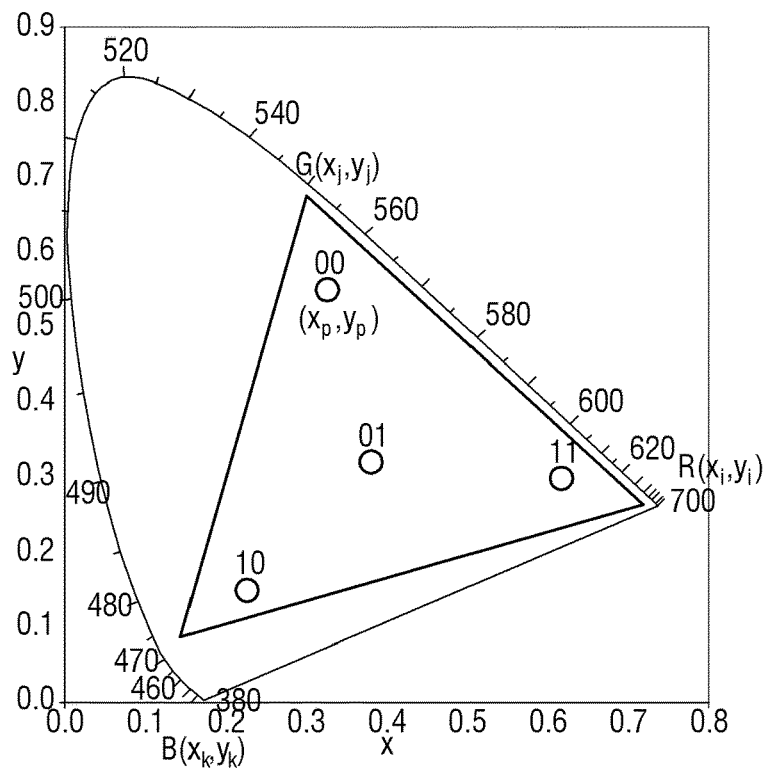
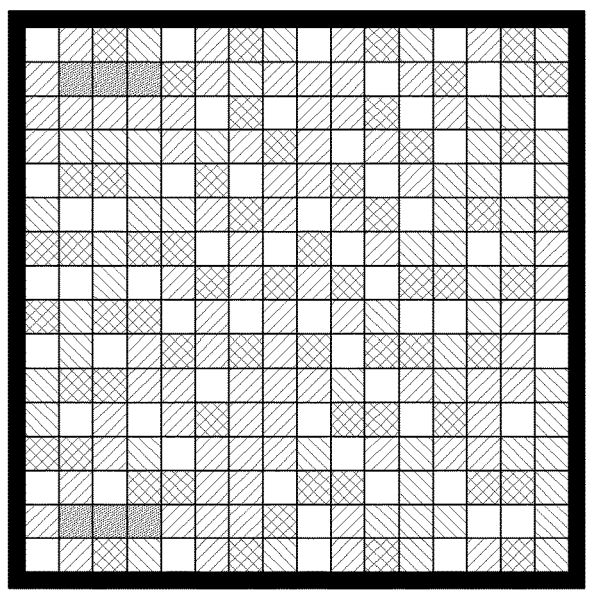

FIG. 3
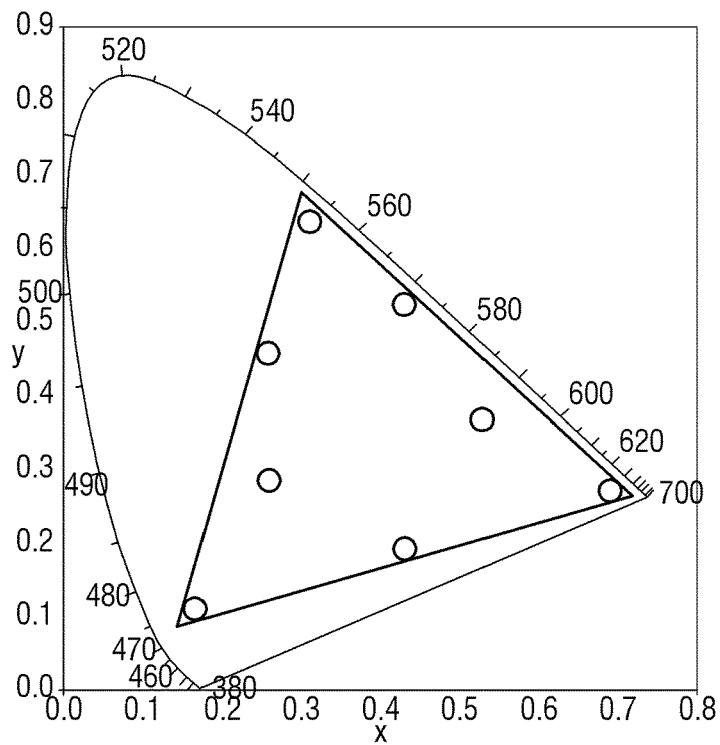
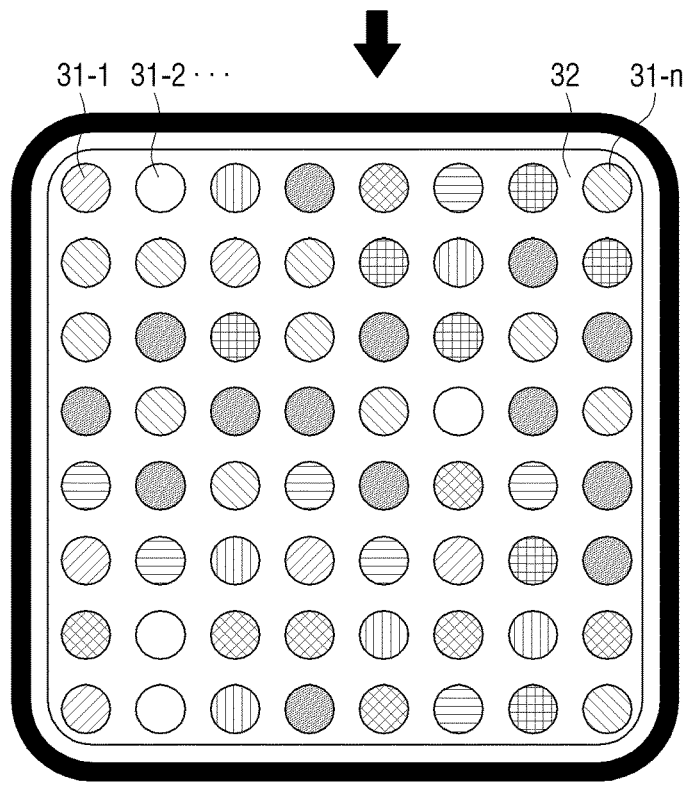

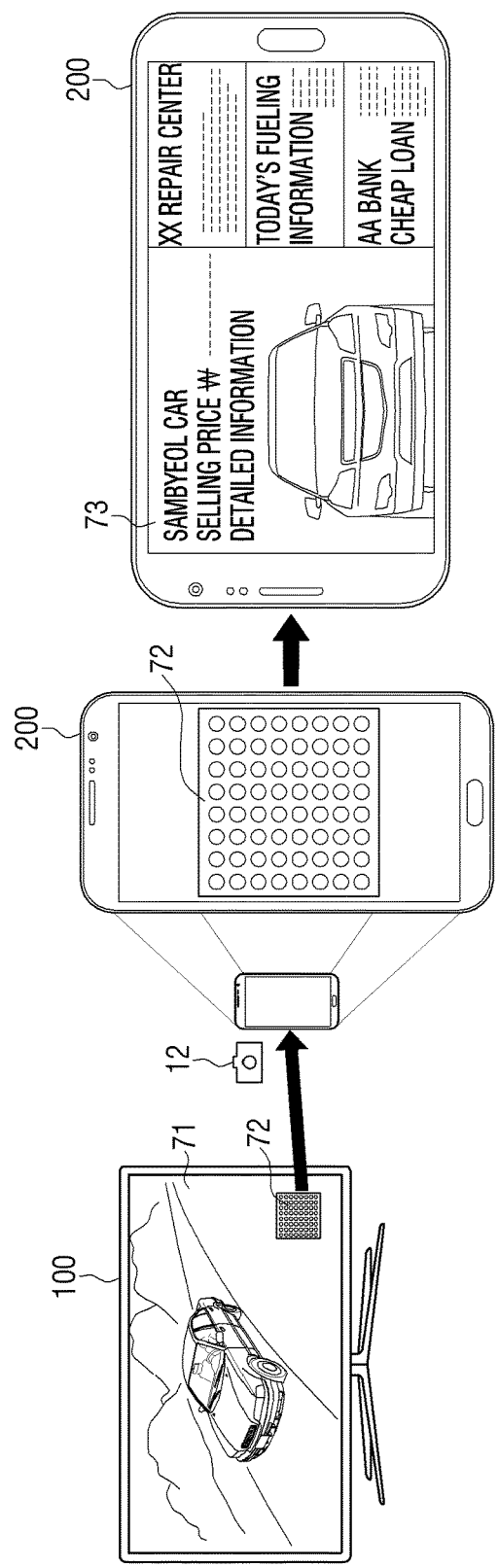

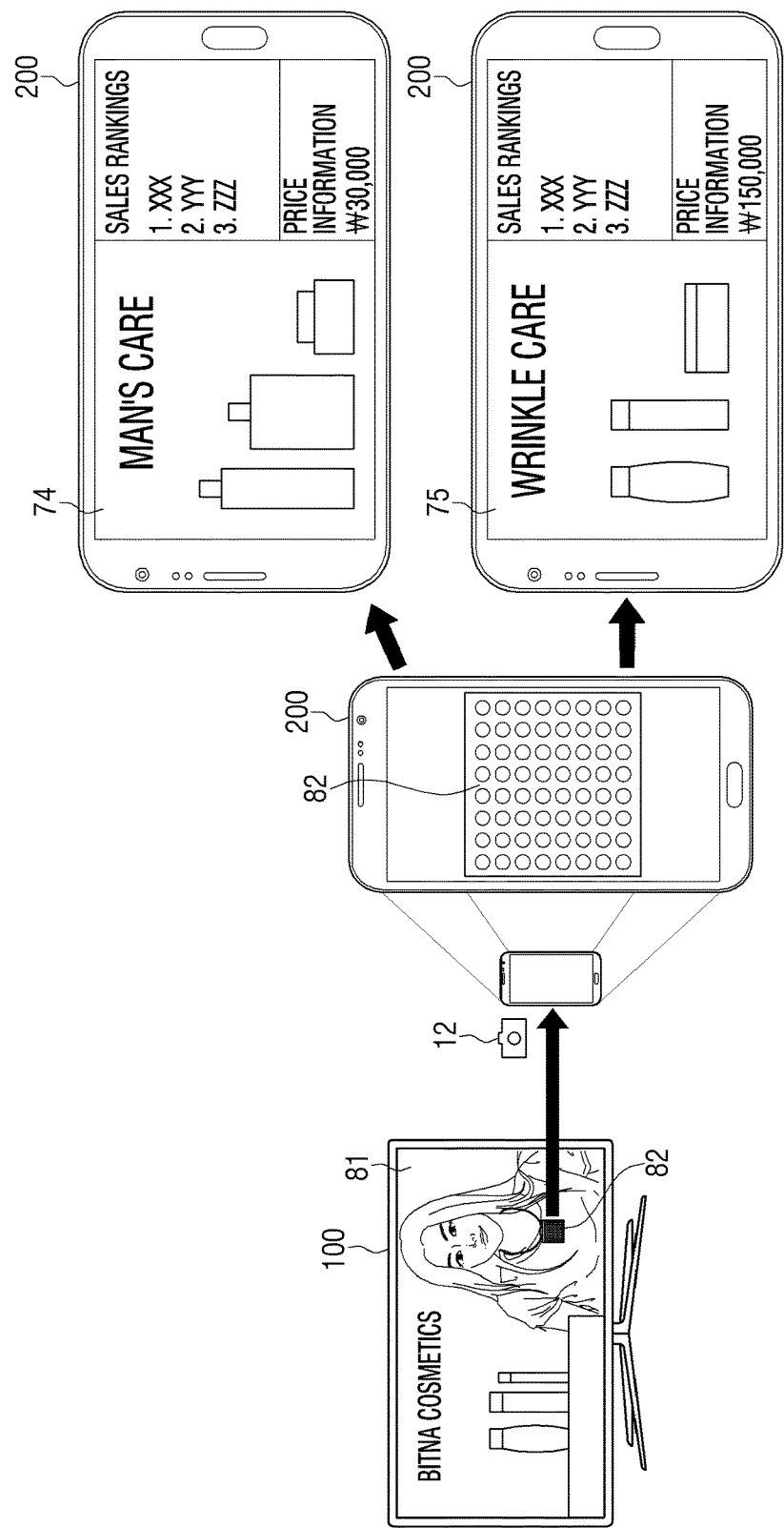

DISPLAY APPARATUS FOR DISPLAYING COLOR IDENTIFICATION CODE AND CONTROL METHOD THEREOF

CROSS-REFERENCE TO RELATED APPLICATION

This application claims priority from Korean Patent Application No. 10-2015-0157622, filed on Nov. 10, 2015, in the Korean Intellectual Property Office, the disclosure of which is incorporated herein by reference in its entirety.

BACKGROUND

1. Field

Apparatuses and methods consistent with exemplary embodiments relate to a display apparatus and a control method thereof, and more particularly, to a display apparatus for providing an advertisement by using a visible light communication (VLC) technique and a control method thereof.

2. Description of the Related Art

The development of various types of display technologies has affected advertising methods. In particular, advertisements using large display apparatuses such as large format displays (LFDs) have increased. As a trend reflecting this, LFDs have been installed in places through which people frequently move such as subway stations or bus stations to provide various types of advertisement via moving images and/or still images.

However, the provision of detailed information of a product or a service through such advertisement is limited, and thus there has appeared a technology that enables a user to directly receive a detailed advertisement wanted by the user through a user terminal apparatus such as a smartphone or the like. For example, the user may acquire detailed information about a product or a service by acquiring and analyzing Quick Response (QR) code or bar code information displayed on a LFD through a user terminal apparatus. Since this advertising method is based on an active activity of a user, the advertising method may avoid a personal information protection problem and provide targeted advertisements. Therefore, this advertising method has been widely used.

In order to include a larger amount of information than a QR code, a visible light wireless communication technology has been recently developed as a new information communication technology that adds an information transmission function to a semiconductor light-emitting diode (LED). Color shift keying (CSK) that is one of representative modulation methods used in a visible light wireless communication technology is a method of respectively differently adjusting amounts of light of LEDs according to data by using, for example, red (R), green (G), and blue (B) LEDs respectively generating different wavelengths, to transmit data.

The related art method of providing a CSK code by using a CSK modulation method selects a method of transmitting multimedia information based on a Moving Picture Experts Group (MPEG) 4 stream. However, this method lowers an aesthetic characteristic of the image, i.e., the image is perceived by a viewer as having an image pixel error and, thus, it is difficult to attract an interest of a user and enable the user to intuitively understand what type of information is provided in the image having a corresponding CSK code.

Therefore, there is a need for enhancing a fine view of a CSK code, to attract an interest of a user and enable the user to intuitively understand provided information.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

One or more exemplary embodiments provide a display apparatus for enhancing a fine view of a CSK code to provide the CSK code capable of attracting an interest and an attention of a user and enhancing understanding of the user, and a control method thereof.

According to an aspect of an exemplary embodiment, a display apparatus includes a display, a communicator configured to communicate with an external server, and a processor configured to receive a color identification code based on HyperText Markup Language 5 (HTML5) from the external server and control the display to display the color identification code and an image corresponding to the color identification code. The color identification code may be a code including information associated with the displayed image recognizable by an external apparatus that captures the displayed color identification code.

The processor may convert the displayed color identification code into an image indicating information provided for a user through the external apparatus recognizing the color identification code and display the image.

A plurality of cells may be arranged in a matrix having an n*n size in the color identification code. Cells respectively constituting a first row and a last row of the matrix may be reference cells having a plurality of preset colors, and other cells except the reference cells in the matrix may be data cells including information associated with the displayed image.

Each of the plurality of cells may be displayed in one of n preset colors.

The processor may rotate the reference cells along a side of the matrix per frame.

The processor may rotate the reference cells to enable reference cells positioned in the first row and the last row of the matrix to move into a first column and a last column of the matrix.

Other cells except cells where the reference cells are positioned may become data cells including information associated with the displayed image according to the rotation. The processor may change and display colors of the data cells whose positions are changed according to the rotation of the reference cells.

The processor may overlay and display the color identification code on an image corresponding to the color identification code.

The processor may display another area except a plurality of cells constituting the color identification code with a preset transparency.

The image may be an advertisement image, and the color identification code may include advertisement information associated with the advertisement image.

According to another aspect of an exemplary embodiment, a control method of a display apparatus includes receiving a color identification code based on HTML5 from an external server, and displaying the color identification code and an image corresponding to the color identification code. The color identification code may be a code including information associated with the displayed image recognizable by an external apparatus that captures the displayed color identification code.

The displaying may include converting the displayed color identification code into an image indicating information provided for a user through the external apparatus that recognizes the color identification code and displaying the image.

A plurality of cells may be arranged in a matrix having an n*n size in the color identification code. Cells respectively constituting a first row and a last row of the matrix may be reference cells having a plurality of preset colors, and other cells except the reference cells in the matrix may be data cells including information associated with the displayed image.

Each of the plurality of cells may be displayed in one of n preset colors.

The displaying may include rotating and displaying the reference cells along a side of the matrix per frame.

The displaying may include rotating the reference cells to enable reference cells positioned in the first row and the last row of the matrix to move into a first column and a last column of the matrix.

Other cells except cells where the reference cells are positioned may become data cells including information associated with the displayed image according to the rotation. The displaying may include changing and displaying colors of the data cells whose positions are changed according to the rotation of the reference cells.

The displaying may include overlaying and displaying the color identification code on an image corresponding to the color identification code.

The displaying may include displaying another area except a plurality of cells constituting the color identification code with a preset transparency.

The image may be an advertisement image, and the color identification code may include advertisement information associated with the advertisement image.

According to another aspect of an exemplary embodiment, a server includes a communicator configured to perform communication with a display apparatus, and a processor configured to generate a color identification code based on HTML5 according to a VLC technique and transmits the generated color identification code to the display apparatus.

According to exemplary embodiments, a fine view of a CSK code may be enhanced to attract an interest and an attention of a user, and the user may intuitively understand what the CSK code indicates due to an animation effect and the like. Therefore, a user attraction effect on information to be provided through the CSK code may be enhanced.

According to another aspect of an exemplary embodiment, a method includes: displaying, on a first image, a color identification code containing coded information for a user, the first image being associated with the color identification code and the information for the user; capturing, with a camera, a second image of the color identification code; and displaying a third image corresponding to the information for the user, the third image being generated by decoding the second image of the color identification code.

BRIEF DESCRIPTION OF THE DRAWING FIGURES

The above and/or other aspects will become more apparent by describing certain exemplary embodiments with reference to the accompanying drawings, in which:

FIG. 2 is a view illustrating a CSK code of a related art Moving Picture Experts Group (MPEG) 4 format, according to an exemplary embodiment;

FIG. 3 is a view illustrating a CSK code of an HTML5 format, according to an exemplary embodiment;

Figure 9:
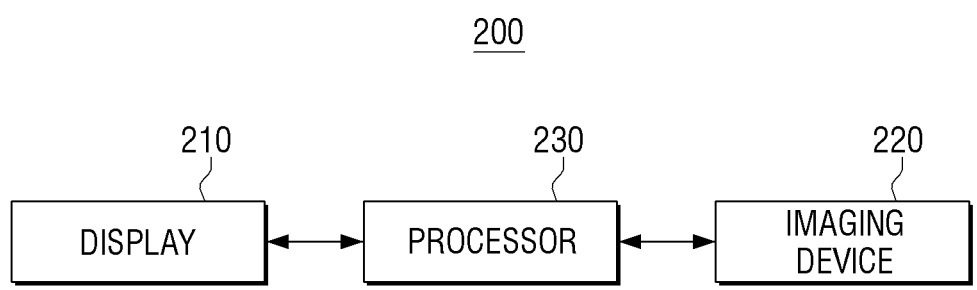
Figure 10:
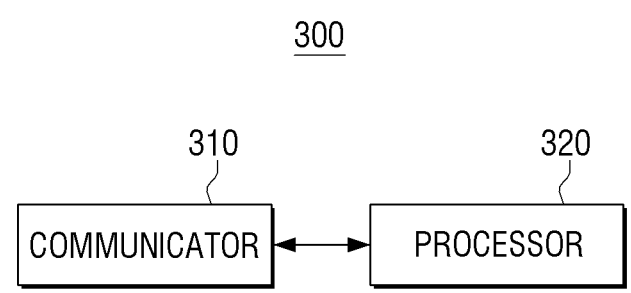
Figure 11:
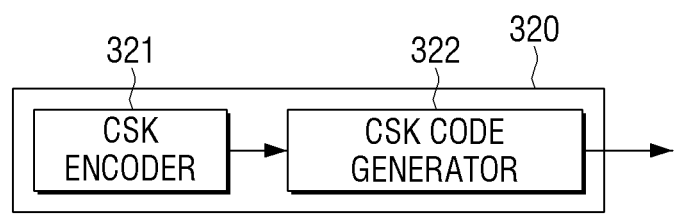
Figure 12:
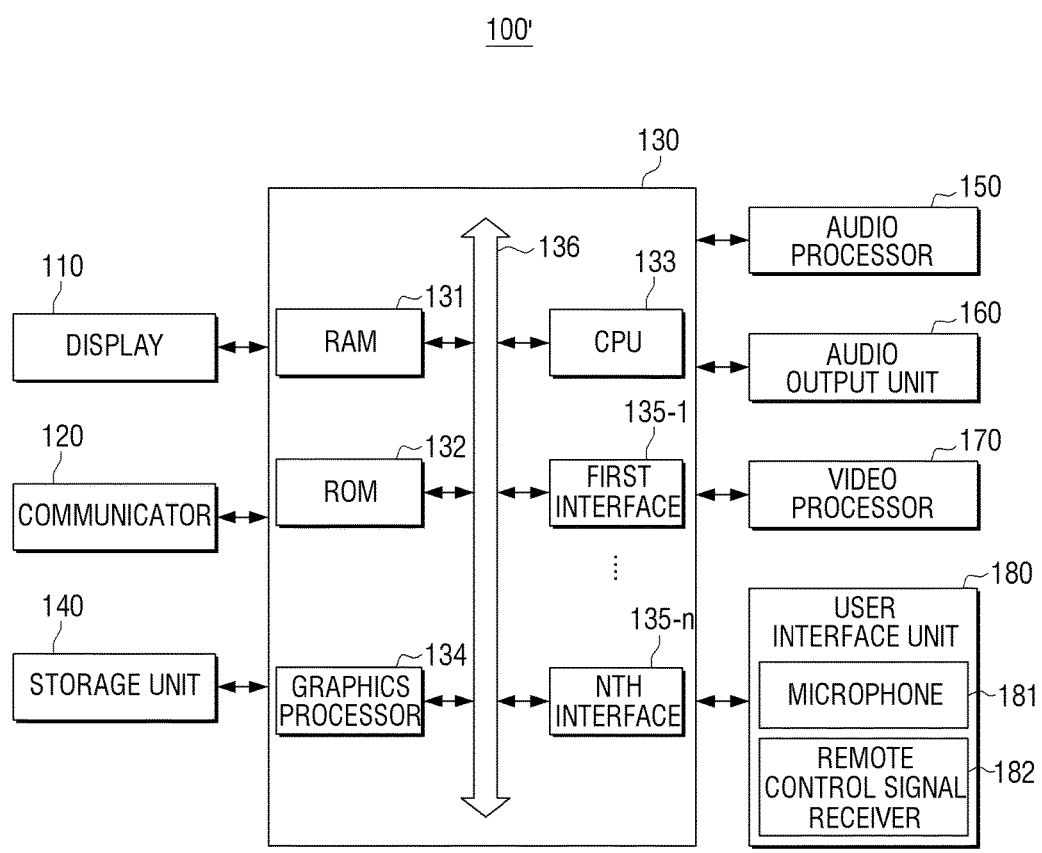
Figure 13:
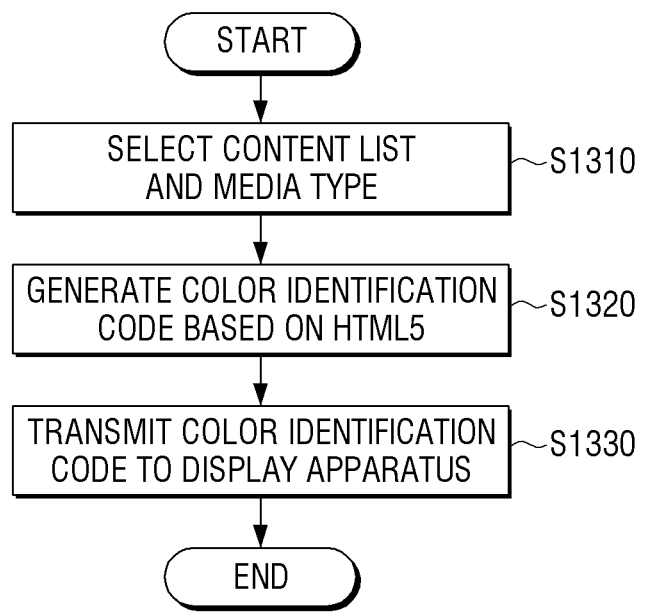
Figure 14:
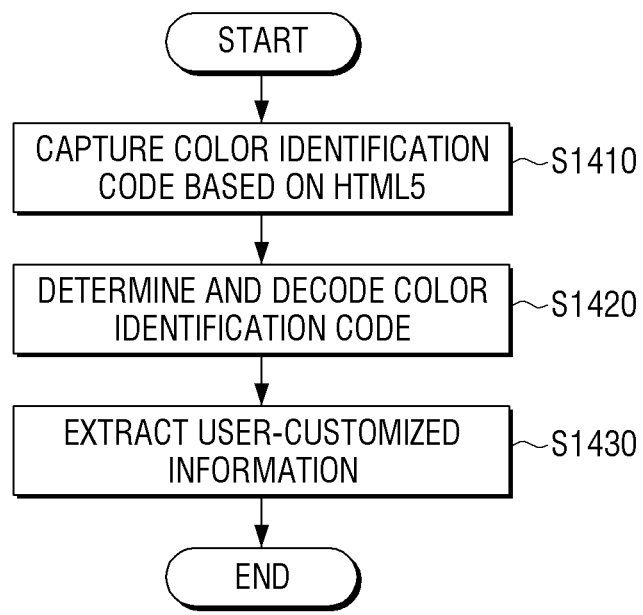
Figure 15:
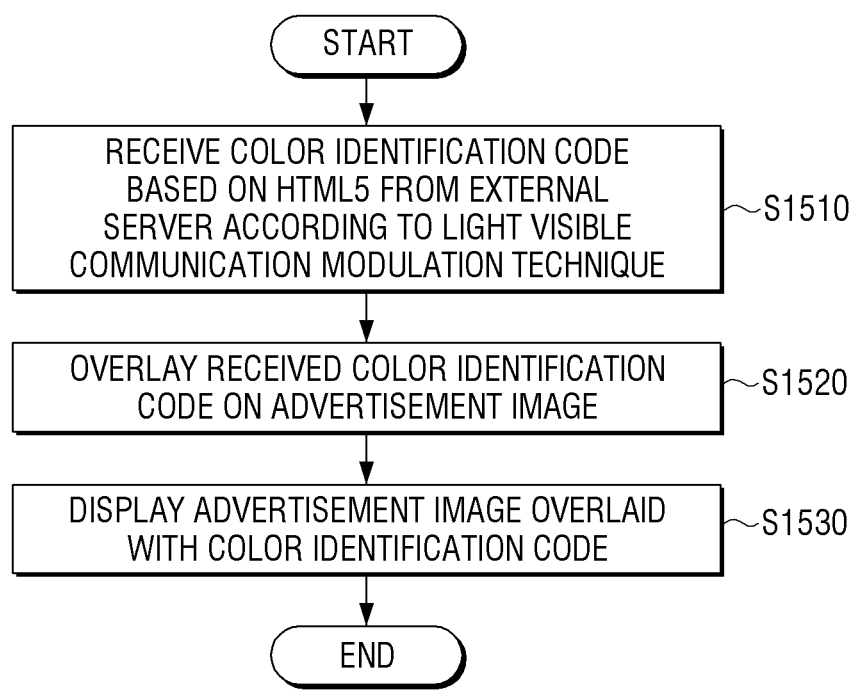

FIGS. 6A, 6B, 6C, and 6D are views illustrating reference cells and rotation of the reference cells made per frame, according to an exemplary embodiment;

FIG. 7 is a view illustrating an operation of enabling a user to capture a CSK code inserted into an advertisement, according to an exemplary embodiment;

FIG. 8 is a view illustrating an operation of enabling a user to be provided with detailed information, according to an exemplary embodiment;

FIG. 9 is a block diagram of a user terminal apparatus according to an exemplary embodiment;

FIGS. 10 and 11 are block diagrams of a server according to an exemplary embodiment;

FIG. 12 is a block diagram of a detailed configuration of a display apparatus according to an exemplary embodiment;

FIG. 13 is a flowchart of a control method of a server according to an exemplary embodiment;

FIG. 14 is a flowchart of a control method of a user terminal apparatus according to an exemplary embodiment; and FIG. 15 is a flowchart of a control method of a display apparatus according to an exemplary embodiment.

DETAILED DESCRIPTION OF THE EXEMPLARY EMBODIMENTS

Certain exemplary embodiments are described in greater detail below with reference to the accompanying drawings.

In the following description, same drawing reference numerals are used for the same elements even in different drawings. The matters defined in the description, such as detailed construction and elements, are provided to assist in a comprehensive understanding of exemplary embodiments. Thus, it is apparent that exemplary embodiments can be carried out without those specifically defined matters. Also, well-known functions or constructions are not described in detail since they would obscure exemplary embodiments with unnecessary detail.

The terms used herein are selected as general terms that are currently widely used in consideration of their functions in an exemplary embodiment. However, this may depend on intentions of those skilled in the art, precedents, emergences of new technologies, or the like. Also, an applicant may arbitrarily select terms in a particular case, and detailed meanings of the terms will be described in description parts of exemplary embodiments corresponding to the particular case. Therefore, the terms used herein may be defined based on meanings of the terms and whole contents of the exemplary embodiments not on simple names of the terms.

Also, the terms "first", "second", etc. may be used to describe diverse components, but the components are not limited by the terms. The terms are only used to distinguish one component from the others. For example, used orders, arrangement orders, or the like of elements that are combined with these ordinal numbers may not be limited by the numbers. If necessary, the ordinal numbers may be respectively replaced and used.

The singular expression also includes the plural meaning as long as it does not differently mean in the context. In the present application, the terms "include" and "comprise" designate the presence of features, numbers, steps, operations, components, elements, or a combination thereof that are written in the specification, but do not exclude the presence or possibility of addition of one or more other features, numbers, steps, operations, components, elements, or a combination thereof.

In the exemplary embodiment, a "module", a "unit", or a "part" performs at least one function or operation, and may be implemented with hardware, software, or a combination of hardware and software. In addition, a plurality of "modules", a plurality of "units", a plurality of "parts" may be integrated into at least one module except for a "module", a "unit", or a "part" which has to be implemented with specific hardware, and may be implemented with at least one processor (not shown).

Also, when any part is connected to another part, this includes a direct connection and an indirect connection through another medium. Unless otherwise defined, when any part includes any element, it may mean that any part further include other elements without excluding other elements.

Figure 1:
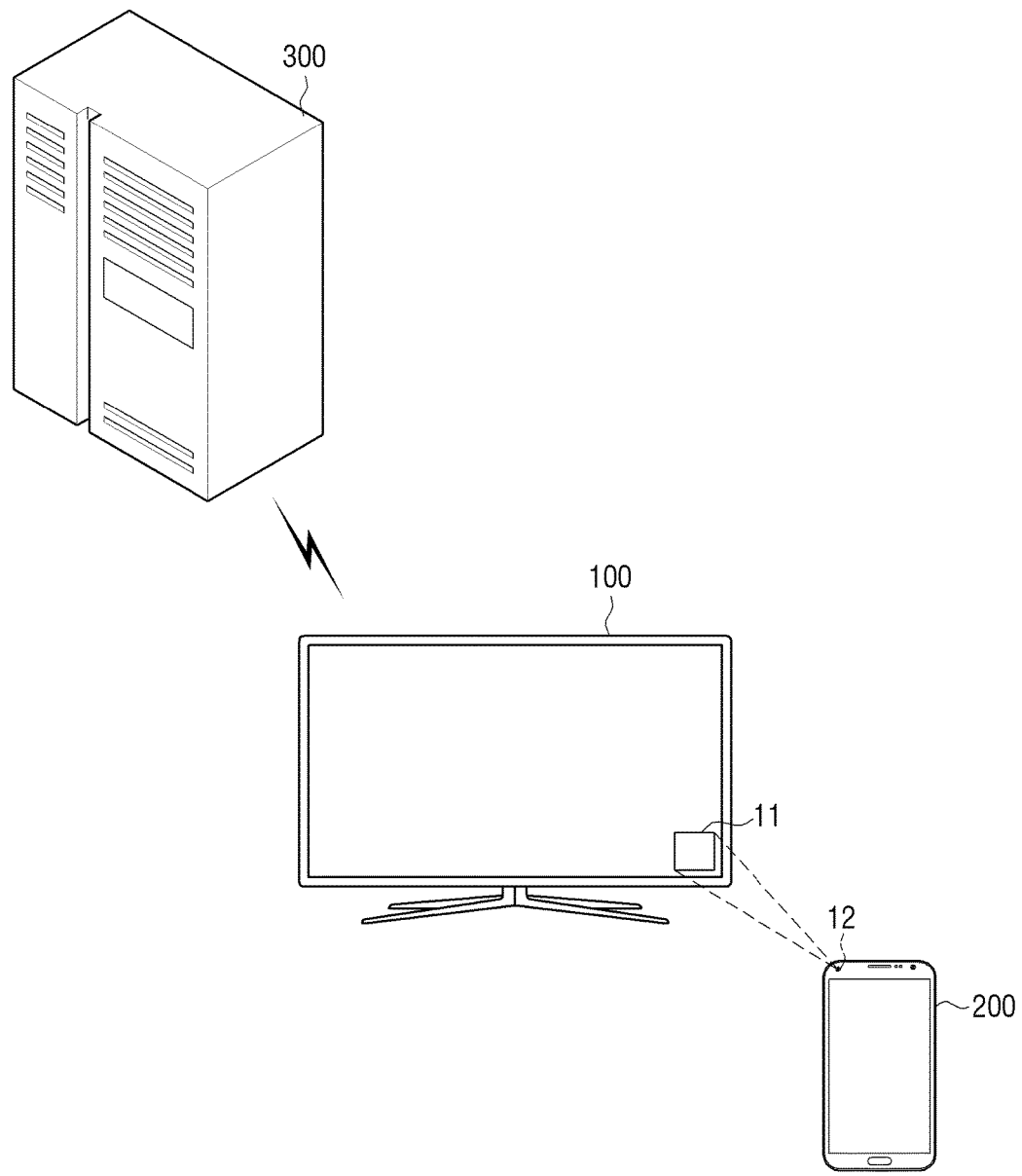
FIG. 1 is a diagram of a configuration of a system for providing information by using a color identification code according to an exemplary embodiment.

FIG. 1 is a diagram of a configuration of a system for providing information by using a color identification code, according to an exemplary embodiment.

Referring to FIG. 1, the system for providing the information by using the color identification code according to an exemplary embodiment includes a display apparatus 100, a user terminal apparatus 200, and a server 300.

The display apparatus 100 provides a color identification code 11 for a user. The display apparatus 100 may include at least one among an electronic bulletin board, an electronic table, an LFD, a kiosk personal computer (PC), a smartphone, a tablet PC, a desktop PC, a notebook computer, and the like. The display apparatus 100 displays the color identification code 11 along with various types of contents such as an advertisement image and the like to enable the user to capture the color identification code 11 and to be provided with associated information about a currently displayed content. For example, the display apparatus 100 according to an exemplary embodiment performs a function of displaying an input advertisement image.

The user terminal apparatus 200 captures the color identification code 11 displayed by the display apparatus 100, extracts information corresponding to the color identification code 11 from the captured color identification code, and provides the extracted information for the user. The user terminal apparatus 200 may include at least one among a portable phone, a smartphone, a tablet PC, a personal digital assistant (PDA), an MPEG Audio Layer-3 (MP3) player, an electronic frame, smart glasses, and the like. The user terminal apparatus 200 may include an imaging device 12 such as a camera for capturing a color identification code or the like. The imaging device 12 may be included in a user terminal apparatus and/or an external imaging device may be connected to the user terminal apparatus.

The server 300 generates the color identification code 11 and transmits the color identification code 11 to the display apparatus 100. The server 300 may transmit a content, which will be displayed along with the color identification code 11, as a content associated with information provided through the color identification code 11 along with the color identification code 11 to the display apparatus 100.

The color identification code 11 generated by the server 300 may be a color identification code that is based on HTML 5. Hereinafter, a color identification code that is generated by the server 300 as a CSK code according to a HTML5-based CSK modulation method will be described.

The CSK code that is generated according to a related art CSK modulation method is generated based on an MPEG-4 stream and inserted into a content. MPEG-4 is one of standards for transmitting and storing an image or a voice as digital data, and independently handles elements such as a screen, a sound, and the like and combines these elements with one another through links to enable the user to view a screen and/or hear a sound.

FIG. 2 illustrates a CSK code that is generated based on a related art MPEG-4 stream.

As shown in FIG. 2, a chromaticity distribution table of a color space provided by International Commission of Illumination (CIE) defines a coding method capable of coding four symbols at four color points in a VLC system. The chromaticity distribution table displays all colors in three types of quantities called x, y, and Y based on a measurement value measured by a spectrophotometer. Here, Y indicates a quantity of brightness of a color by a photometric quantity and chromaticity of a pair of x and y. Chromaticity is a characteristic of a color except brightness and is represented with dots on x and y axes. If chromaticity of monochromatic light of each wavelength is represented with a dot in a chromaticity distribution table, represented dots are connected to one another with lines, and pure purple and pure red-purple dots are connected, a horseshoe shape may be drawn on the chromaticity distribution table, and all colors may be included therein.

A central point of a triangle including three bands among colors defined by the chromaticity distribution table is allocated by a symbol having a binary value of 01. An upper vertex G may be allocated by a symbol having a binary value of 00, a lower vertex B may be allocated by a symbol having a binary value of 10, and a right vertex R may be allocated by a symbol having a binary value of 11 (4-CSK).

As shown in FIG. 2, the CSK code has a square shape formed in a matrix including a plurality of cells, and one of red, green, blue, and gray symbols as described above are allocated to each of the cells. In other words, each symbol of the CSK code may include 2-bit data and transmit multimedia information, such as music, a photo, a moving image, or the like, based on an MPEG-4 stream.

However, in comparison with a QR code, a related art CSK code as described above may transmit a large amount of data and is limited in being encoded in the same MPEG format as a content such as a moving image or the like that will be displayed along with the CSK code. Therefore, it is inconvenient to generate or replace the existing CSK code. Also, the related art CSK code reduces a fine image view because it is perceived in the image as an image pixel error and is difficult to attract an interest of the user and is difficult to enable the user to understand what type of information is provided from the CSK code in the related art methods.

A CSK code provided in an exemplary embodiment may be generated based on a HTML5 format. The HTML5 format is a latest standard of a basic programming language used for producing a web document, i.e., a next generation web language standard that may produce music and a moving image on an Internet browser without an additional program. The CSK code generated based on the HTML5 may be displayed in a web browser area overlaid in a preset area of a content, such as a moving image or the like, to harmonize with the content.

The related art CSK code is a 4-CSK including red, green, blue, and gray colors based on an MPEG-4 format as shown in FIG. 2. However, the CSK code provided in an exemplary embodiment may be expressed as 8-CSK of eight colors. In other words, if 4-CSK is expressed with 4 colors per one cell, 8-CSK may be expressed with 8 colors per one cell.

As shown in FIG. 3, in a chromaticity distribution table, five symbols may be further allocated in addition to three symbols of the related art and positioned at vertexes of a triangle. The CSK code based on the HTML5 according to an exemplary embodiment may be expressed with eight colors corresponding to one of eight symbols as described above per one cell and thus may include 3-bit data per one cell.

As shown in FIG. 3, the CSK code based on the HTML5 may have an enhanced fine view to harmonize with an image displayed along with a CSK code. In detail, each of a plurality of cells 31-1 and 31-2 through 31-n constituting a CSK code arranged in a matrix of n*n may have one of n preset colors. Here, cells of the CSK code may be formed in circular shapes and not in squares as in the related art. Also, spaces 32 between the circular cells may have opacity values to be transparent or semi-transparent to enable a content overlaid with a CSK code to be shown through spaces. In addition, an edge of a CSK may be constituted to be enclosed by a frame having a preset width to enable a focus point of an imaging device to automatically check the frame and easily recognize an internal CSK code. Also, each corner of the CSK code may have a round shape to be felt smooth.

In this case, many more various colors of the CSK code may be shown to a user, an aesthetic characteristic is high, thereby attracting an interest and an attention of the user.

The CSK code may include common advertisement information for all users or customized advertisement information for a particular user together. For example, the common advertisement information may be a webpage Uniform Resource Locator (URL) providing shopping information for a user. If a user captures a CSK code displayed on the display apparatus 100 by using the user terminal apparatus 200 of the user, the user terminal apparatus 200 may provide an URL included in the common advertisement information. If the user selects a URL, the user terminal apparatus 200 may display a webpage by accessing the corresponding URL.

Similarly, the customized advertisement information may be a webpage URL providing shopping information for a particular user. If the user captures the CSK code displayed on the display apparatus 100 by using the user terminal apparatus 200 of the user, the user terminal apparatus 200 may provide a URL included in the customized advertisement information by analyzing the CSK code. If the user selects a URL, the user terminal apparatus 200 may display a webpage by accessing the corresponding URL.

The CSK code may include different multimedia contents or URL information according to user information including at least one selected from a gender and an age range of the user. If the user captures the CSK code through the user terminal apparatus 200 carried by the user, a multimedia content, URL information, or the like matching with a user profile (a gender, an age, or the like) set in the user terminal apparatus 200 may be transmitted to the user terminal apparatus 200. The multimedia content or the URL information may be transmitted in a JavaScript Object Notation (JSON) format.

The user terminal apparatus 200 may display webpage information on a screen by automatically visiting a corresponding webpage.

Figure 4:
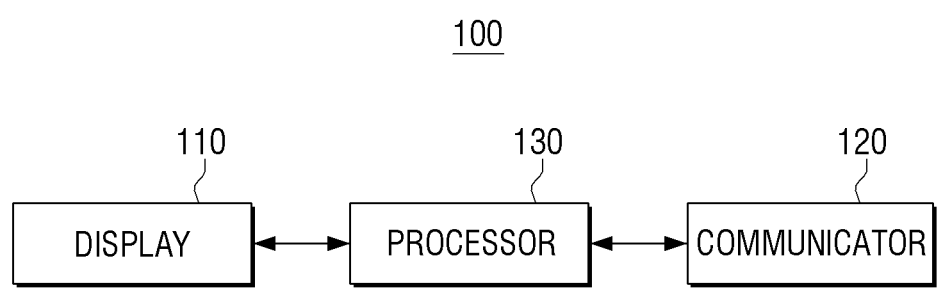
FIG. 4 is a block diagram of a display apparatus according to an exemplary embodiment.

FIG. 4 is a block diagram of a display apparatus 100 according to an exemplary embodiment.

Referring to FIG. 4, the display apparatus 100 includes a display 110, a communicator 120, e.g., a transceiver or a communication interface, and a processor 130, e.g. a microprocessor.

The display 110 includes a frame rate converter (not shown), a video enhancer (not shown), and a display module (not shown). The video enhancer removes deterioration or noise of an image, and processed image data is stored in a frame buffer. The frame rate converter adjusts a frame rate, and the image data of the frame buffer is transmitted to the display module according to a preset frame rate.

The display module is a circuit element that outputs an image to a display panel (not shown) and may include a timing controller (not shown), a gate driver (not shown), a data driver (not shown), and a voltage driver (not shown).

The timing controller (not shown) generates a gate signal (a scan control signal) and a data control signal (a data signal), rearranges input R, G, and B data, and supplies the rearranged R, G, and B data to the data driver (not shown). The gate driver (not shown) applies a gate on/off voltage, which is provided from the voltage driver, to the display panel according to a gate control signal generated by the timing controller. The data driver (not shown) completes scaling and inputs R, G, and B data of an image frame to the display panel according to a data control signal generated by the timing controller (not shown). The voltage driver (not shown) generates driving voltages and respectively transmits the driving voltages to the gate driver, the data driver, the display panel, and the like.

The display panel may be designed by using various types of technologies. The display panel of the display 110 may include one of a light emitting diode (LED), a liquid crystal display (LCD) panel, a plasma display panel (PDP), a vacuum fluorescent display (VFD), a field emission display (FED), and an Electroluminescent Display (ELD). The display panel may be mainly constituted as a light emission type but does not exclude a reflective display (e.g., E-ink, P-ink, Photonic Crystal, or the like). In addition, the display panel may include a flexible display, a transparent display, or the like.

The communicator 120 may receive a CSK code by communicating with the server 300 that generates the CSK code and transmit the CSK code to the display apparatus 100. The communicator 120 may receive the CSK code and/or may receive a value corresponding to a color of a symbol that will be displayed in each cell of the CSK code. The processor 130 may control each cell of a CSK code template pre-stored in the display apparatus 100 to change into a color corresponding to a received value.

The communicator 120 may receive a content such as an advertisement image or the like from the server 300 or an external apparatus. The display apparatus 100 may display advertisement images provided by several different advertisement agencies. For example, the communicator 120 may receive advertisements from several channels of a broadcasting station by using a broadcasting network and/or may receive advertisement images from a plurality of Internet sources by using a web server or web servers. The communicator 120 may receive advertisement images from various types of recording media players that are included in or connected to the display apparatus 100.

A recording medium player is an apparatus that plays advertisement images stored in various types of recording media such as a compact disc (CD), a digital versatile disc (DVD), a hard disc, a Blu-ray disc (BD), a memory card, a universal serial bus (USB) memory, and the like.

If the communicator 120 receives an advertisement image from a broadcasting station, the communicator 120 may include elements such as a tuner (not shown), a demodulator (not shown), and the like.

The tuner selects a radio frequency (RF) broadcast signal corresponding to a selected channel from RF signals received through an antenna and converts the selected RF broadcast signal into an intermediate frequency (IF) signal, baseband image, or a sound signal. If the selected RF broadcast signal is a digital broadcast signal, the tuner converts the selected RF broadcast signal into a digital IF. If the selected RF broadcast signal is an analog broadcast signal, the tuner converts the analog broadcast signal into an analog baseband image or a sound signal (composite video, blanking and sync (CVBS) selective identification features (SIF)). An output signal is input into a signal processor (not shown). The tuner may receive a single carrier RF broadcast signal according to an Advanced Television System Committee (ATSC) method or a plurality of RF broadcast signals according to a digital video broadcasting (DVB) method.

The demodulator performs a modulation operation by receiving the digital IF signal converted by the tuner. If the digital IF signal output from the tuner complies with the ATSC method, the demodulator performs an 8-level vestigial sideband (8-VSB). If the digital IF signal output from the tuner complies with the DVB method, the demodulator performs a Coded Orthogonal Frequency-Division Multiple Access (COFDMA). The demodulator may perform channel decoding such as trellis decoding, deinterleaving, Reed-Solomon decoding, or the like.

If channel decoding is performed, a transport stream (TS) is output. The TS may be a signal where an image signal, a sound signal, and a data signal are multiplexed. For example, the TS may be MPEG-2 TS where an MPEG-2 standard image signal, a Dolby Audio Coding-3 (AC-3) standard sound signal, and the like are multiplexed. The TS output from the demodulator is input into the signal processor (not shown).

The communicator 120 may receive an advertisement image from an external server such as a web server. In this case, the communicator 120 may include a network interface card. The display apparatus 100 and the web server may comply with Transmission Control Protocol/Internet Protocol (TCP/IP) that is a standard protocol for transmitting information on the Internet.

The communicator 120 may include various types of wireless communication modules. The communicator 120 may include a short-range communication module such as a wireless fidelity (Wi-Fi) module, a Bluetooth module, an Infrared Data Association (IrDA) module, a near-field communication (NFC) module, a ZigBee module, a radio frequency identification (RFID) module, an ultra-wideband (UWB) module, or the like. Also, the communicator 120 may include a 3G mobile communication module such as a Wideband Code Division Multiple Access (WCDMA), a High Speed Downlink Packet Access (HSDPA), or a High Speed Packet Access (HSPA), a 4G mobile communication module such as Mobile Worldwide Interoperability for Microwave Access (WiMAX) or wireless broadband Internet (WiBro), or a 4G Long Term Evolution (LTE) module.

The communicator 120 may receive an advertisement image from a set-top box. The set-top box may support a bidirectional communication to support an Internet Protocol Television (IPTV).

The communicator 120 may include at least one selected from various types of technical elements as described above and may receive advertisement images from a plurality of different modules.

Also, although not shown, the display apparatus 100 according to an exemplary embodiment may further include a signal processor (not shown) and a scaler (not shown).

The signal processor performs signal-processing with respect to image information and voice information constituting an advertisement image. If a stream signal is received, the signal processor may demultiplex the stream signal to divide the stream signal into an image signal, a sound signal, and a data signal. If the demultiplexed image signal is an encoded image signal, the signal processor performs decoding by using a decoder. For example, the signal processor may decode an MPEG-2 standard encoded image signal by using an MPEG-2 decoder and decode an image signal of Digital Multimedia Broadcasting (DMB) or H.264 of DVB-H by using an H.264 decoder. The signal processor may process brightness, tint, tone, and the like of an image signal.

The signal processor may process the demultiplexed voice signal. For example, the signal processor may decode an encoded voice signal of MPEG-2 standard by using an MPEG-2 decoder and decode an encoded voice signal of MPEG-4 Bit-Sliced Arithmetic Coding (BSAC) standard of DMB by using an MPEG-4 decoder. The signal processor may decode an encoded voice signal of MPEG-2 Advanced Audio Codec (AAC) of a DMB or DVB-H method by using an AAC decoder. Further, the signal processor may adjust base, Treble, volume, and the like.

The scaler (not shown) scales an advertisement image received according to a preset scaling ratio. Scaling indicates that a distribution range is multiplied by a constant in order to include a distribution range of a pixel value in a preset range.

The processor 130 controls an overall operation of the display apparatus 100. The processor 130 may include a system on chip (SoC).

The processor 130 may receive a HTML5-based color identification code and control the display 110 to display the color identification code and an image corresponding to the color identification code. The color identification code received from the external server 300 may be a CSK code, and the image corresponding to the color identification code may be an advertisement image or the like associated with information to be provided through the color identification code. As another example, the color identification code may be a code including information associated with the displayed image recognizable by an external apparatus such as the user terminal apparatus 200 or the like that captures the displayed color identification code. Hereinafter, for convenience of description, the color identification code will be described as being a CSK code.

The CSK code may be generated in an HTML5 format by the external server 300 and then transmitted to the display apparatus 100 or may be automatically generated by the display apparatus 100 itself. The processor 130 may write a CSK code, which will provide a URL connected to a webpage providing information associated with a multimedia file or content associated with a content to be displayed, overlay the written CSK code in an area of the content to be displayed, and display the overlaid CSK code.

The processor 130 may convert the displayed CSK code into an image indicating information provided for a user through an external apparatus that recognizes the CSK code and may display the image.

Figure 5:
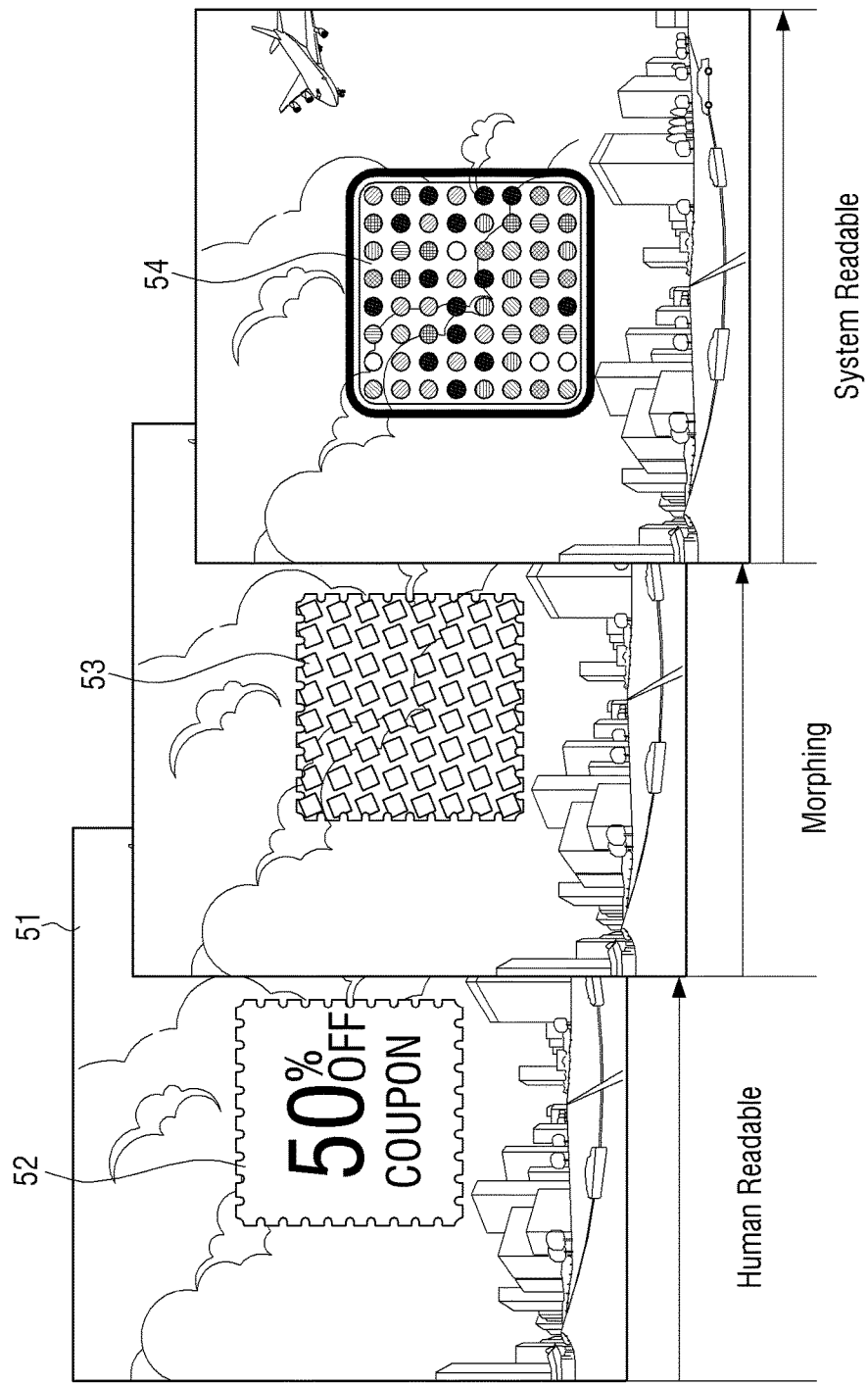
FIG. 5 is a view illustrating a method of enabling a user to understand information that a CSK code is to provide, through an animation effect, according to an exemplary embodiment.
Figure 6A:
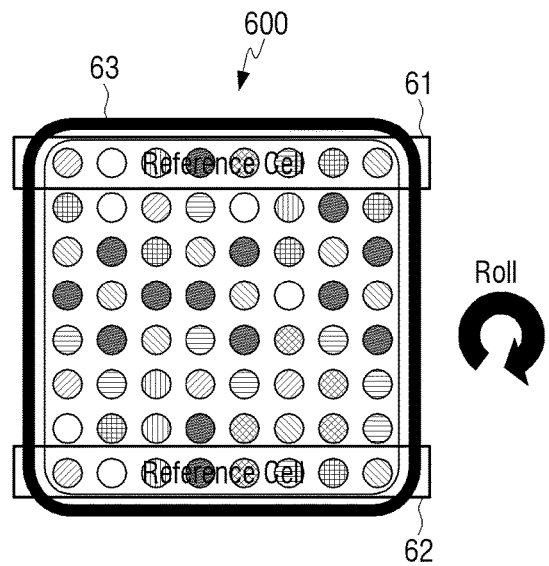
Figure 6B:
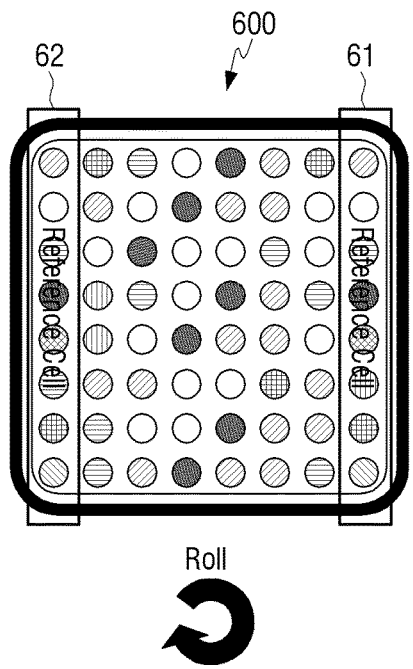
Figure 6D:
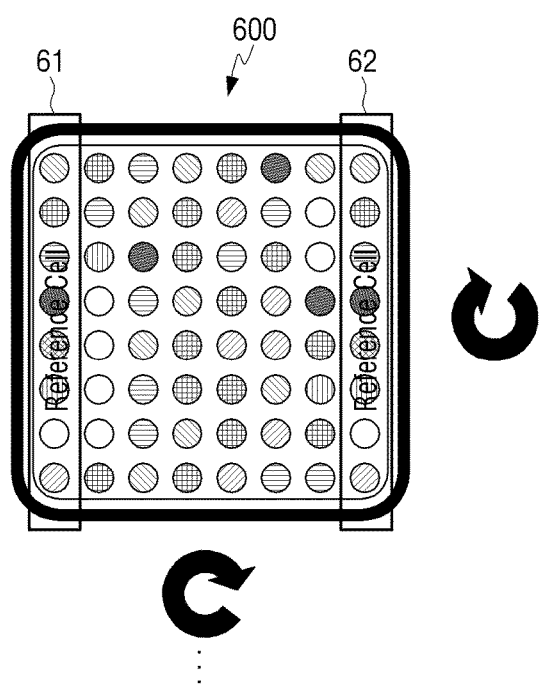
Figure 6C:
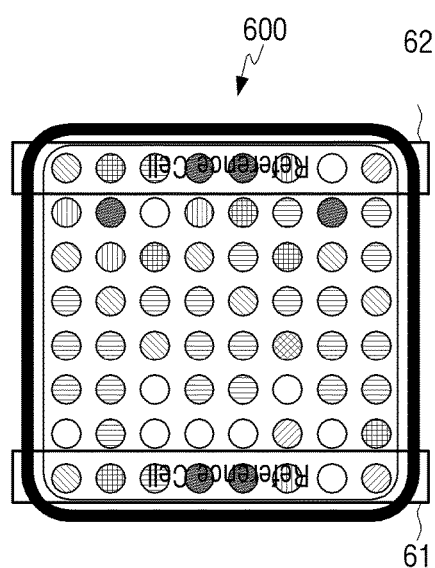

FIG. 5 is a view illustrating a method of enabling a user to understand information that a CSK code is to provide through an animation effect, according to an exemplary embodiment.

If a CSK code is inserted into an image and then displayed on the display apparatus 100, it is difficult to attract an interest and an attention of a user for the CSK code, and it is difficult to enable the user to understand what type of information is to be provided through the CSK code. The present exemplary embodiment solves these problems.

Referring to FIG. 5, a CSK code overlaid on a displayed image may be converted into a particular image. The image into which the CSK code is converted may be an image or the like that enables the user to understand a service that the corresponding CSK code is to provide. For example, as shown in FIG. 5, a coupon image 52 describing "50% OFF COUPON" may be displayed in an area of an advertisement image 51 displayed on the display apparatus 100. The displayed coupon image 52 may be changed into a CSK code 54 after a preset time elapses, and the CSK code 54 may be changed again into the coupon image 52 after a preset time elapses. In other words, the processor 130 may alternately and repeatedly execute a "human readable" operation of displaying an associated image to enable the user to understand contents of a provided service and a "system readable" operation of capturing the CSK code 54 through an imaging device of the user terminal apparatus 200 to analyze the CSK code 54.

The processor 130 may further add a "morphing" operation to make an effect of naturally changing the "human readable" operation into the "system readable" operation. The "morphing" operation is an operation of performing animation-processing to extract a corresponding point between the coupon image 52 and the CSK code 54 to slowly change the coupon image 52 into the CSK code 54. The coupon image 52 may be slowly changed into a morphing image 53 and finally changed into the CSK code 54. The CSK code 54 is changed into the morphing image 53 and finally changed into the coupon image 52 through the "morphing" operation. Therefore, the user may further intuitively check contents of a service provided through the CSK code 54 and further naturally understand the contents of the service by repeatedly displaying a particular image and the CSK code through morphing.

If the CSK code 54 is captured by the user terminal apparatus 200, the user terminal apparatus 200 may receive information from a server capable of providing information associated with the CSK code 54. The server capable of providing the information associated with the CSK code 54 may include the server 300 providing the CSK code 54 or another server connected through the Internet or the like. In FIG. 5, the server providing the information associated with the CSK code 54 may transmit a URL connected to an Internet website capable of providing 50% discount coupon or a real discount coupon to the user terminal apparatus 200.

A coupon image may have the same shape and size as a CSK code. For example, if a CSK code has a size of a square shape of 10 cm by 10 cm, a coupon image may also have a square shape of 10 cm by 10 cm, as the CSK code. However, this is not limiting and the size may be bigger or smaller than 10 cm by 10 cm. Also, the size and/or the shape of the coupon image may be different from the CSK code.

FIGS. 6A, 6B, 6C, and 6D are views illustrating reference cells and rotation of the reference cells made per frame, according to an exemplary embodiment.

As shown in FIGS. 6A through 6D, cells constituting a first row 61 and a last row 62 among a plurality of cells arranged in a matrix of n*n size may be set to reference cells, i.e., first cells, having a plurality of preset colors, and other cells 600, i.e., second cells, may be set to data cells including data. A reference cell may be a cell for correcting a color distortion caused by indoor lighting and a light exposure degree when capturing a CSK code, i.e., a cell for enhancing a color code recognition rate by correcting a color of a data cell by a distortion of a color of the reference cell and enabling the imaging device of the user terminal apparatus 200 to first recognize the reference cell in the CSK code to further appropriately recognize the CSK code. A color may be distorted according to illumination or reflected light, and thus if a reference cell is set, a shifted degree of the color caused by illumination may be calculated and deduced as a coordinate value or the like, thereby correcting distortion.

Referring to FIGS. 6A to 6D, a total of 16 cells of the first row 61 and the last row 62 in an 8×8 CSK code having eight cells respectively in length and width may include reference cells 61 and 62. The reference cells 61 and 62 may be displayed in colors corresponding to one symbol of eight symbol points positioned at an edge of a triangle on a chromaticity distribution table. The imaging device of the user terminal apparatus 200 may check a reference cell in a frame captured by using a cross-correlation function. If a CSK code is captured from an image captured by a camera by using the reference cells 61 and 62, the user terminal apparatus 200 determines whether a cross-correlation value between a data cell of the CSK code and the reference cells 61 and 62 is higher than a threshold value and, if the cross-correlation value is higher than the threshold value, determines the image as the CSK code. If distorted degrees of colors of the reference cells 61 and 62 are determined through the cross-correlation value, the user terminal apparatus 200 may correct colors of data cells by using the distorted degrees and demodulate the data cells through the corrected colors. The reference cells 61 and 62 of the first row and the last row may have the same patterns of colors. In a CSK code having a matrix shape, the other cells 600, which do not include the reference cells 61 and 62, are data cells including information associated with a displayed image.

The processor 130 may rotate reference cells along a side boundary 63 of a matrix per frame as shown in FIGS. 6A through 6D. In detail, whenever a frame of the CSK code is changed, the processor 130 may rotate and move a position of a reference cell 90 degrees along a side boundary of the matrix. In other words, the processor 130 rotates reference cells to move reference cells positioned in the first row and the last row into a last column and a first column, respectively, so that different reference cells may be designated in each cycle. In this case, some of the cells disposed at certain positions in the first and last rows that were designated as the reference cells in the previous cycle, become data cells, and include information associated with the displayed image, and thus the processor 130 may change and display colors of the data cells whose positions are changed according to the rotation of the reference cells. The processor 130 may repeatedly rotate a reference cell 90 degrees as a frame is changed.

Since positions of designated reference cells move along a side boundary, the processor 130 may further appropriately recognize the reference cells although swaying, tilting, or the like of the user terminal apparatus 200 occurs due to a hand tremor of the user who captures a CSK code. Although in FIGS. 6A-6D the rotation is shown as clockwise, the rotation may be counterclockwise.

FIG. 7 is a view illustrating an operation of enabling a user to capture a CSK code inserted into an advertisement to be provided with detailed information about the corresponding advertisement, according to an exemplary embodiment.

As shown in FIG. 7, the display apparatus 100 may display a car advertisement image 71 and display a CSK code 72, which is capable of providing information associated with an advertisement image, in an area of a screen. If the user captures the CSK code 72 by using an imaging device of the user terminal apparatus 200, received advertisement information may be displayed in an area of the screen 73 of the user terminal apparatus 200. The advertisement information may be information included in the CSK code 72 or URL information connected to a website. If there is a plurality of pieces of advertisement information, the user terminal apparatus 200 may display some of the plurality of pieces of advertisement information or may display advertisement information selected by the user.

Referring to FIG. 7, the user terminal apparatus 200 may display advertisement information, which includes a current selling price, repair center information, fueling information, loan information, and the like of a corresponding car, as information associated with car advertisement information.

FIG. 8 is a view illustrating an operation of enabling a user to be provided with detailed information targeted at a gender and an age range of the user, according to an exemplary embodiment.

As shown in FIG. 8, a CSK code 82 may be freely disposed in any position of a screen. If the user captures the CSK code 82 by using the imaging device of the user terminal apparatus 200, received advertisement information may be displayed in an area of the screen of the user terminal apparatus 200. A received advertisement may be a customized advertisement for a particular user.

The CSK code 82 may include a plurality of pieces of information corresponding to all age ranges and genders, and if the user terminal apparatus 200 captures the CSK code 82, the user terminal apparatus 200 may receive only information corresponding to a profile of the corresponding user based on a user profile (a gender, an age, or the like) stored in the user terminal apparatus 200. For example, as shown in a screen 74 of FIG. 8, if the user is a man, the user terminal apparatus 200 may receive information about products for men and display sale products, sales ranking, price information, and the like. If the user is a woman in her 50s, the user terminal apparatus 200 may receive information about wrinkle care products for managing wrinkles for women in their 50s, and display associated information on a screen 75.

Here, information transmitted to the user terminal apparatus 200 may be URL information constituted in a JSON format.

FIG. 9 is a block diagram of a user terminal apparatus 200, according to an exemplary embodiment.

Referring to FIG. 9, the user terminal apparatus 200 includes a display 210, an imaging device 220, and a processor 230.

The display 210 displays an image based on an image signal processed by the processor 230 and has a similar technical configuration to a configuration of the display 110 of the display apparatus 100 described with reference to FIG. 4, and thus detailed contents thereof are omitted.

The imaging device 220 captures a CSK code displayed by the display apparatus 100. The CSK code may provide a plurality of pieces of continuous different color identification information, and thus the imaging device 220 may include an element for continuously capturing a plurality of still images and/or moving images. The imaging device 220 includes at least one of a shutter, a lens unit, an aperture, and a charge coupled device (CCD) or a complementary metal oxide semiconductor (CMOS) image sensor. The shutter and the aperture control an amount of exposed light. The light is accumulated through a photodiode (PD) of a pixel array of the CCD or the CMOS image sensor, and output as an electrical signal according to the accumulated amount of light. A color filter array (CFA) filter may be used to acquire a color image. CFA filters pass light indicating one color per one pixel to be regularly arranged and may have several shapes according to arrangement structures. The lens unit includes a zoom lens that zooms in or out a size of a subject and a focus lens that adjusts a focus of the subject. The output electrical signal is converted into a digital signal through an analog-to-digital converter (ADC). Also, independent processing is performed with respect to a still image and a live-view.

The processor 230 controls an overall operation of the user terminal apparatus 200. In particular, the processor 230 may control the imaging device 220 to capture a CSK code. The processor 230 appropriately sets a frame rate and controls to sequentially capture frames of the CSK code according to the frame rate. The processor 230 may extract a plurality of pieces of advertisement information by analyzing the captured CSK code. The processor 230 may extract a plurality of pieces of advertisement information by analyzing the CSK code according to a standard of Institute of Electrical and Electronics Engineers (IEEE) 802.15.7 and control to display the extracted advertisement information.

The processor 230 includes a hardware element such as a central processing unit (CPU), a cache memory, or the like, an operating system (OS), and a software element of an application performing a particular purpose. A control command of each element for an operation is read from a memory according to a system clock, and an electrical signal is generated according to the read control command, thereby operating elements of hardware.

The user terminal apparatus 200 may further include a storage unit (not shown) or may be connected to an external storage unit or a server for storing provided advertisement information. For example, the storage unit may include a memory such as a read only memory (ROM) or a random access memory (RAM), a hard disk drive (HDD), a BD, and the like. The memory may be a nonvolatile memory such as an electrically erasable and programmable ROM (EEROM) or a nonvolatile RAM but does not exclude using of a volatile memory such as a static RAM or a dynamic RAM. A small hard disk of 1.8 inches or less that may be installed in the user terminal apparatus 200 may be used as the HDD. The storage unit may store a profile such as a gender, an age, and the like, and the processor 230 may selectively receive information appropriate for the user by using the stored profile.

The user terminal apparatus 200 may further include a communicator (not shown) that enables the Internet to visit a website included in advertisement information.

The communicator may include at least one of a short-range communication module such as a Wi-Fi module, a Bluetooth module, an IrDA module, an NFC module, a ZigBee module, a RFID module, a UWB module, or the like. Also, the communicator may include a 3G mobile communication module such as a WCDMA, an HSDPA, an HSUPA, or an HSPA, a 4G mobile communication module such as Mobile WiMAX or WiBro, or a 4G LTE module.

The communicator may include a network interface card. In this case, the user terminal apparatus 200 and a web server may comply with TCP/IP that is a standard protocol for transmitting information on the Internet. TCP is a rule about a technology that divides and packages transmission data into preset units, and IP is a rule about a technology that directly exchanges data.

FIGS. 10 and 11 are block diagrams of a server 300, according to an exemplary embodiment.

The server 300 according to the present exemplary embodiment includes a communicator 310 and a processor 320.

The communicator 310 performs communication with the display apparatus 100. The communicator 310 may transmit a generated CSK code to the display apparatus 100. The communicator 310 may transmit the CSK code to the display apparatus 100 and/or may transmit a value corresponding to a color of a symbol, which will be displayed in each cell of the CSK code, to the display apparatus 100.

The processor 320 controls an overall operation of the server 300. In particular, the processor 320 may generate a CSK code based on HTML5 and transmit the generated CSK code to the display apparatus 100. Alternatively, the processor 320 may transmit a color value corresponding to each cell of the CSK code to the display apparatus 100 in each frame. The processor 320 may transmit a color value corresponding to each cell along with position information of each cell according to a command using JavaScript to change a color of each cell of the CSK code.

FIG. 11 is a block diagram of the processor 320 of the server 300, according to an exemplary embodiment. Referring to FIG. 11, the processor 320 includes a CSK encoder 321 and a CSK code generator 322.

The CSK encoder 321 generates information about colors and positions of cells of all frames of the CSK code from data that will be transmitted to the display apparatus 100. The information generated by the CSK encoder 321 is transmitted to the CSK code generator 322, and the CSK code generator 322 generates frames in HTML5 templates by using the received information and renders a CSK code having an animation effect by JavaScript.

In a CSK code based on a related art MPEG-4 method, all frames of the CSK code are generated as still images, and the generated still images are made into an MPEG-4 stream file to reproduce the CSK code. In a CSK code based on an HTML5 method according to an exemplary embodiment, a frame having an HTML5 template is generated by using information about colors and positions of cell units of all frames, and thus a CSK code may be expressible in various shapes, such as an animation effect and the like, by JavaScript.

FIG. 12 is a block diagram of a detailed configuration of a display apparatus 100' according to an exemplary embodiment.

As shown in FIG. 12, the display apparatus 100' according to the present exemplary embodiment includes a display 110, a communicator 120, a processor 130, a storage unit 140, an audio processor 150, an audio output unit 160, a video processor 170, and a user interface unit 180. Hereinafter, descriptions of elements of FIG. 12 overlapping with descriptions of elements of FIG. 4 are omitted.

The storage unit 140 may store various types of modules for driving the display apparatus 100'.

The storage unit 140 may store a base module processing signals respectively transmitted from pieces of hardware included in the display apparatus 100', a storage module managing a database (DB) or a registry, a security module, a communication module, and the like.

In particular, the storage unit 140 may store various types of modules for directly generating a CSK code instead of receiving the CSK code from the server 300. The storage unit 140 may include a CSK code encoding module that encodes the CSK code, a CSK code generating module that generates the CSK code, and the like. The processor 130 may generate information about colors and positions of cell units of all frames of the CSK code by executing the CSK code encoding module. The processor 130 may generate HTML5 template-based frames based on the information generated by the CSK code encoding module by executing the CSK code generating module and render a CSK code having an animation effect by JavaScript.

The audio processor 150 performs processing with respect to audio data.

The audio output unit 160 outputs the audio data processed by the audio processor 150.

The video processor 170 performs various types of image-processing, such as decoding, scaling, noise filtering, frame rate converting, resolution converting, and the like, with respect to an input image.

The user interface unit 180 senses a user interaction for controlling an overall operation of the display apparatus 100'. In particular, the user interface unit 180 may include various types of interaction sensing devices such as a microphone 181, a remote control signal receiver 182, and the like.

The processor 130 may control an overall operation of the display apparatus 100' by using various types of modules stored in the storage unit 140.

As shown in FIG. 12, a RAM 131, a ROM 132, a CPU 133, a graphics processor 134, first through $n^{th}$ interfaces 135-1 through 135-n, and the like of the processor 130 may be connected to one another through a bus 136.

The ROM 132 stores a command set and the like for system booting. The CPU 133 copies various types of application programs stored in the storage unit 140 into the RAM 131 and executes the application programs copied into the RAM 131 to perform various types of operations.

The graphics processor 134 generates a screen including various types of objects such as an icon, an image, a text, and the like by using an operator (not shown) and a renderer (not shown). The operator calculates attribute values such as coordinate values at which objects will be respectively displayed, shapes, sizes, and colors of the objects, and the like, according to a layout of a screen. The renderer generates a screen of various types of layouts including objects based on the attribute values calculated by the operator.

The CPU 133 accesses the storage unit 140 to perform booting by using the OS stored in the storage unit 140. The CPU 133 performs various types of operations by using various types of programs, contents, data, and the like stored in the storage unit 140.

The first through $n^{th}$ interfaces 135-1 through 135-n are connected to various types of elements as described above. One of interfaces may be a network interface connected to an external apparatus through a network.

FIG. 13 is a flowchart illustrating a control method of a server according to an exemplary embodiment.

In operation S1310, a content to be provided through a color identification code and a media type of the content may be selected by a user. If the content and the media type of the content are selected, an HTML5-based color identification code is generated in operation S1320. The color identification code may be a CSK code.

The operation of generating the color identification code includes encoding information about colors and positions of cell units of all frames of the color identification code and generating an HTML5 template frame by using the encoded information to render the color identification code.

In operation S1330, the generated color identification code is controlled to be transmitted to the display apparatus 100.

FIG. 14 is a flowchart illustrating a control method of a user terminal apparatus, according to an exemplary embodiment.

When a color identification code is overlaid and displayed on an image in the display apparatus 100, the color identification code is captured in operation S1410. The image overlaid with the color identification code may be an advertisement image, and information provided through the color identification code may be detailed information associated with a product advertised through an advertisement image.

In operation S1420, the captured color identification code is determined and decoded.

In operation S1430, user-customized information is extracted from information provided from the color identification code based on a user profile. The extracted user-customized information may be displayed through the user terminal apparatus 200.

FIG. 15 is a flowchart illustrating a control method of a display apparatus, according to an exemplary embodiment.

In operation S1510, an HTML5-based color identification code is received from an external server through a VLC technique. The color identification code may be a CSK code.

The received color identification code is overlaid on an advertisement image corresponding to the color identification code in operation S1520, and the advertisement image overlaid with the color identification code is displayed in operation S1530.

The color identification code is a code including information associated with a displayed image recognizable by an external apparatus, e.g., the user terminal apparatus 200, that captures the displayed color identification code. The displayed color identification code may be converted into an image indicating information provided for a user through the external apparatus that recognizes the color identification code.

A plurality of cells may be arranged in a matrix having a n*n size in a color identification code, cells respectively constituting a first row and a last row of the matrix may be reference cells having a plurality of preset colors, and other cells except the reference cells in the matrix may be data cells including information associated with a displayed image. Each of the plurality of cells may be displayed in one of n preset colors. Moreover, the reference cells may be rotated and displayed along a side boundary of the matrix per frame.

Other cells except cells where reference cells are positioned may become data cells including information associated with the displayed image according to the rotation, and colors of data cells whose positions are changed according to rotations of the reference cells may be changed. The color identification code may be overlaid and displayed on an image corresponding to the color identification code. The other area, in which a plurality of cells constituting the color identification code is not provided, may be displayed with a preset transparency.

The image may be an advertisement image, and the color identification code may include advertisement information associated with the advertisement image.

A control method of a display apparatus according to the above-described various exemplary embodiments may be embodied as a program and then stored on various types of recording media. In other words, a computer program that is processed by various types of processors to execute various types of control methods described above may be stored and used on a recording medium.

For example, there may be provided a non-transitory computer-readable medium that stores a program performing receiving an HTML5-based color identification code from an external server and displaying the color identification code and an image corresponding to the color identification code.

The non-transitory computer-readable medium is a medium which does not store data temporarily such as a register, cash, and memory but stores data semi-permanently and is readable by devices. More specifically, the aforementioned applications or programs may be stored in the non-transitory computer-readable media such as CD, DVD, HDD, BD, USB, memory card, and/or ROM.

The foregoing exemplary embodiments and advantages are merely exemplary and are not to be construed as limiting. The present teaching can be readily applied to other types of apparatuses. The description of exemplary embodiments is intended to be illustrative, and not to limit the scope of the claims, and many alternatives, modifications, and variations will be apparent to those skilled in the art.

What is claimed is:

1. A display apparatus comprising:
a display;
a transceiver; and
a processor configured to:
based on receiving a color identification code via the transceiver, control the display to display information representing contents of a service related to the color identification code, and
control the display to provide a transition from the information to an image of the color identification code via a morphing image, and provide an animation effect during providing the morphing image,
wherein the color identification code comprises reference cells and data cells, and is recognizable by capturing the displayed color identification code, each of the reference cells being configured to correct a color distortion caused by an external light exposure degree,
wherein the processor is further configured to obtain a corresponding point between the information and the image of the color identification code and control the display to display the morphing image based on the corresponding point, and
wherein the processor is further configured to change positions of the reference cells and control the display to display the color identification code by changing colors of the data cells of which positions are changed according to the changed positions of the reference cells.

2. The display apparatus of claim 1, wherein the color identification code comprises a plurality of cells arranged in a matrix having an n*n size, and
the processor is further configured to set first cells, from among the plurality of cells, which are disposed in a first row and a last row of the matrix as reference cells having a plurality of preset colors, and set second cells, from among the plurality of cells, which are not set as the reference cells, as the data cells comprising information of the service.

3. The display apparatus of claim 2, wherein each of the plurality of cells is displayed in one of n preset colors.

4. The display apparatus of claim 2, wherein the processor is further configured to rotate positions of the reference cells along a side boundary of the matrix by 90 degrees, per frame.

5. The display apparatus of claim 4, wherein the processor is further configured to rotate the positions of the reference cells from the first row and the last row to the positions in a last column and a first column of the matrix, respectively.

6. The display apparatus of claim 5, wherein the processor is further configured to:
set the second cells, which are not positioned in the first column and the last column, as the data cells comprising the information of the service;
change colors of the data cells of which positions are changed according to rotation of the positions of the reference cells; and
control the display to display the data cells with the changed colors.

7. The display apparatus of claim 1, wherein a second image is an advertisement image corresponding to the color identification code.

8. The display apparatus of claim 7, wherein the color identification code comprises a pattern including cells arranged in a matrix and a free space between the cells, and
the processor is further configured to display the free space included in the pattern of the color identification code, with a predetermined transparency.

9. The display apparatus of claim 7, wherein
the color identification code comprises advertisement information associated with the advertisement image.

10. A control method of a display apparatus, the control method comprising:
receiving a color identification code comprising reference cells and data cells, from a server, each of the reference cells being configured to correct a color distortion caused by an external light exposure degree;
displaying information representing a contents of a service related to the color identification code based on the receiving the color identification code;
providing a transition from the information to an image of the color identification code via a morphing image, and providing an animation effect during providing the morphing image; and
displaying the color identification code transitioned from the image,
wherein the color identification code is recognizable by capturing the displayed color identification code, and
wherein the providing the animation effect comprises obtaining a corresponding point between the information and the image of the color identification code and providing the morphing image based on the corresponding point,
wherein the displaying the color identification code comprises changing positions of the reference cells and displaying by changing colors of the data cells of which positions are changed according to the changed positions of the reference cells.

11. The control method of claim 10, wherein the color identification code comprises a plurality of cells arranged in a matrix having an n*n size, and
the displaying the color identification code comprises:
setting first cells, from among the plurality of cells, which are disposed in a first row and a last row of the matrix as reference cells having a plurality of preset colors; and
setting second cells, from among the plurality of cells, which are not set as the reference cells, as the data cells comprising information of the service.

12. The control method of claim 11, wherein each of the plurality of cells is displayed in one of n preset colors.

13. The control method of claim 11, wherein the displaying the color identification code further comprises:
rotating positions of the reference cells along a side boundary of the matrix by 90 degrees, per frame; and
displaying the reference cells of which the positions along the side boundary of the matrix are rotated.

14. The control method of claim 13, wherein the displaying the color identification code further comprises rotating the positions of the reference cells from the first row and the last row to the positions in a last column and a first column of the matrix, respectively.

15. The control method of claim 14, wherein the displaying the color identification code further comprises:
setting the second cells, which are not positioned in the first column and the last column, as the data cells comprising the information of the service;
changing colors of the data cells of which positions are changed according to rotation of the positions of the reference cells; and
displaying the data cells with the changed colors.

16. The control method of claim 10, wherein a second image is an advertisement image corresponding to the color identification code.

17. The control method of claim 16, wherein the color identification code comprises a pattern including cells arranged in a matrix and a free space arranged between the cells, and
the displaying the color identification code further comprises displaying the free space included in the pattern of the color identification code, with a predetermined transparency.

* * * * *